(12) United States Patent
Yamamizu

(10) Patent No.: US 10,078,360 B2
(45) Date of Patent: Sep. 18, 2018

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Hiroshi Yamamizu, Matsudo (JP)

(73) Assignee: Canon Kabushiki Kaisha, Tokyo (JP)

(*) Notice: Subject to any disclaimer, the term of this patent is extended or adjusted under 35 U.S.C. 154(b) by 167 days.

(21) Appl. No.: 15/088,774

(22) Filed: Apr. 1, 2016

(65) Prior Publication Data

US 2016/0306413 A1    Oct. 20, 2016

(30) Foreign Application Priority Data

Apr. 14, 2015  (JP) ................. 2015-082857

(51) Int. Cl.
*G06F 1/00* (2006.01)
*G06F 1/32* (2006.01)
*H04N 1/00* (2006.01)

(52) U.S. Cl.
CPC .......... *G06F 1/3287* (2013.01); *G06F 1/3209* (2013.01); *G06F 1/3284* (2013.01); *H04N 1/00885* (2013.01); *Y02D 10/159* (2018.01); *Y02D 10/171* (2018.01)

(58) Field of Classification Search
None
See application file for complete search history.

(56) References Cited

U.S. PATENT DOCUMENTS

| | | | | |
|---|---|---|---|---|
| 2009/0310607 A1* | 12/2009 | Evans | .................... | H04L 12/12 370/389 |
| 2011/0261405 A1* | 10/2011 | Ito | ........................ | G06F 1/3203 358/1.15 |
| 2012/0023353 A1* | 1/2012 | Lee | ....................... | G06F 1/3231 713/323 |
| 2012/0257247 A1* | 10/2012 | Yamasaki | ........ | G06K 15/4055 358/1.15 |
| 2013/0073885 A1* | 3/2013 | Hiramatsu | ........... | G06F 1/3231 713/320 |
| 2014/0118779 A1* | 5/2014 | Ito | ..................... | H04N 1/00896 358/1.15 |

FOREIGN PATENT DOCUMENTS

JP    2006-332807 A    12/2006

* cited by examiner

*Primary Examiner* — Paul Juei-Fu Yen
(74) *Attorney, Agent, or Firm* — Fitzpatrick, Cella, Harper & Scinto

(57) ABSTRACT

The present invention presents an information processing apparatus capable of having a plurality of power saving states, and a method of controlling the same. The apparatus times a specific packet reception time interval, and select, based on the timed reception time interval, one of the plurality of power saving states into which to transition. If the apparatus satisfies a condition for transitioning into a power saving state, the information processing apparatus transitions to the selected power saving state.

10 Claims, 13 Drawing Sheets

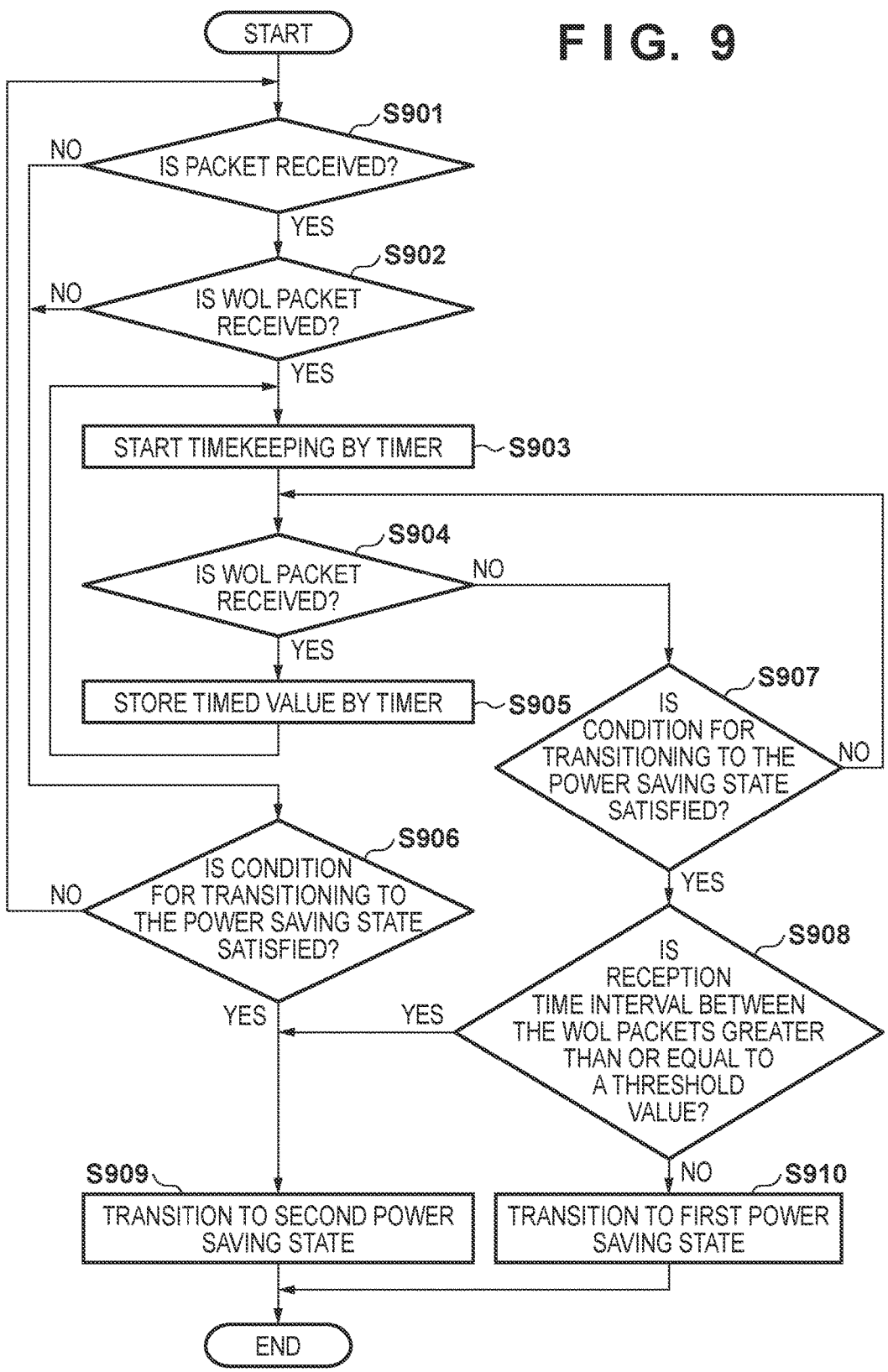

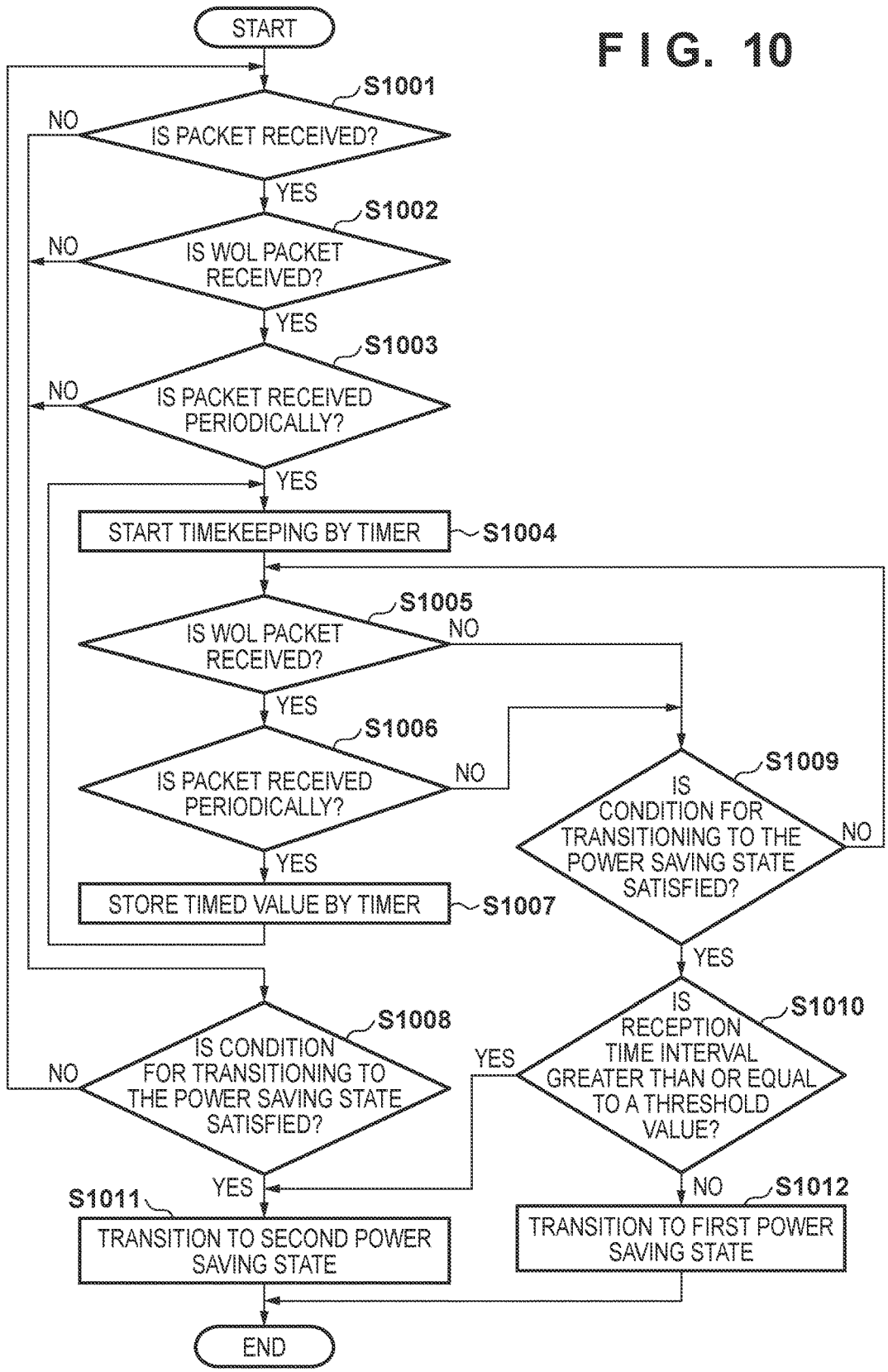

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

A network environment in which an image forming apparatus is connected largely differs depending on the number of connected PCs and the network infrastructure established by respective companies, but as a condition for the image forming apparatus to transition to a power saving state, a timer (timekeeping of a time period for transition to the power saving state) held inside the apparatus is relied upon for an instruction to transition to the power saving state. Alternatively, the image forming apparatus transitions to the power saving state in accordance with an instruction from a user (for example a pressing of a switch).

For example, Japanese Patent Laid-Open No. 2006-332807 discloses, in a terminal apparatus connected to a network, detecting a degree of congestion of the network by the number of packets received per unit time, and then setting a power saving mode in accordance with the degree of congestion.

There are various network environments in which an image forming apparatus is connected, and for example, if a CPU of the image forming apparatus enters a power saving state in an environment in which network traffic is high, there is the possibility of causing user convenience to decrease due a response to a received packet being inferior to in a normal state (standby state). In contrast to this, it may be considered that when responsiveness with respect to a received packet is raised by always setting the CPU to an operational state, power consumption increases.

Also, if a power saving mode is set in accordance with the number of packets received per unit time as in the above described prior art, it becomes impossible to cause a transition to such a power saving mode in spite of the fact that it is possible to respond to a received packet even in the power saving mode that has lower power consumption.

SUMMARY OF THE INVENTION

An aspect of the present invention is to eliminate the above-mentioned problems with conventional technology.

A feature of the present invention is to provide a technique that can suppress power consumption of an apparatus by transitioning to a power saving state in accordance with a packet receiving interval.

According to a first aspect of the present invention, there is provided an information processing apparatus capable of having a plurality of power saving states, the apparatus comprising: a timer unit configured to time a receiving interval at which a specific packet is received; a selecting unit configured to select, based on the receiving interval timed by the timer unit, any one of the plurality of power saving states; and a power supply control unit configured to cause the information processing apparatus, if the information processing apparatus satisfies a transition condition, to transition to the power saving state selected by the selecting unit among the plurality of power saving states.

According to a second aspect of the present invention, there is provided an information processing apparatus capable of having a plurality of power saving states, the apparatus comprising: a setting unit configured to set, in accordance with a user instruction, a power saving state to apply to the information processing apparatus among the plurality of power saving states; a power supply control unit configured to cause the information processing apparatus, if the information processing apparatus has satisfied a transition condition, to transition to the power saving state set by the setting unit among the plurality of power saving states; a timer unit configured to time a receiving interval at which a specific packet is received; a determination unit configured to determine, based on the receiving interval timed by the timer unit, whether or not a power saving state to apply to the information processing apparatus requires prompting a user to change to another power saving state from the power saving state set by the setting unit; and a notification unit configured to prompt a user to change the power saving state to apply to the information processing apparatus, if it is determined by the determination unit that it is necessary to prompt the user to change the power saving state to apply to the information processing apparatus.

Further features of the present invention will become apparent from the following description of exemplary embodiments with reference to the attached drawings. Note, in the accompanying drawings, the same reference numerals are added for same or similar configuration elements.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flowchart for describing processing when the image forming apparatus according to the first embodiment transitions to a power saving state.

FIG. 10 is a flowchart for describing processing when the image forming apparatus according to a second embodiment transitions to a power saving state.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that although explanation is given of an example of an image forming apparatus as one example of an information processing apparatus of the present invention, the present invention is not limited to this, and can also be applied to, for example, a communication apparatus, a facsimile apparatus, a multi-function peripheral, or the like.

[First Embodiment]

Figure 1:
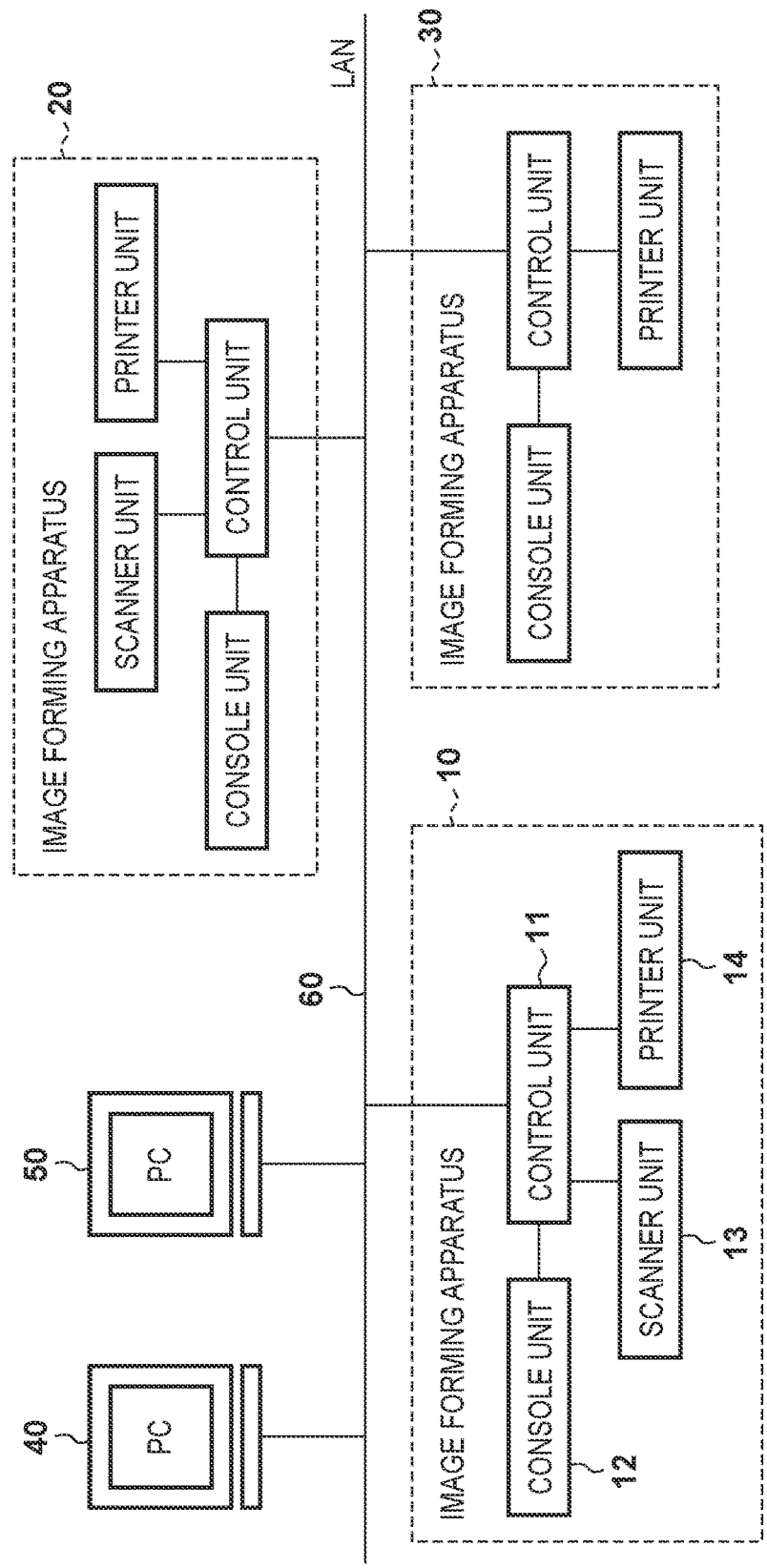
FIG. 1 depicts a view illustrating an example configuration of a network system that includes an image forming apparatus according to a first embodiment of the present invention.

FIG. 1 depicts a view illustrating an example configuration of a network system that includes an image forming apparatus according to the first embodiment of the present invention.

In example illustrated in FIG. 1, while host computers 40, 50, which are external apparatuses, and image forming apparatuses 10, 20, 30 are connected to a LAN 60, the present invention is not limited to this configuration. In addition, in the first embodiment, although these devices are connected via a LAN, the present invention is not limited to this, and for example it may be any network, such as a WAN (public network) or a wireless line.

The host computers (hereinafter PCs) 40, 50 have a function of a typical personal computer. The PCs 40, 50 can use an FTP or an SME protocol to transmit/receive a file or an electronic mail via the LAN 60 or a WAN. In addition, the PCs 40, 50 can issue a print instruction via a printer driver to the image forming apparatuses 10, 20, 30. Furthermore, the PCs 40, 50 can query a state of an image forming apparatus by periodically using an SNMP packet, for example, towards the image forming apparatuses 10, 20, 30. The image forming apparatuses 10, 20, 30 can return information such as whether printing is possible in response to a request from the PCs 40, 50. In addition, the image forming apparatus 10 and the image forming apparatus 20 have the same configuration. While the image forming apparatuses 10, 20 have a scanner unit, the image forming apparatus 30 has a print function by having a printer unit, and differs on the point of not having a scanner unit.

Below, in order to simplify the explanation, the image forming apparatus 10 from the image forming apparatuses 10, 20 is focused on, and the configuration and operation thereof is explained in detail, but the same is true for the image forming apparatus 20. Also, although the image forming apparatus 30 does not have a scanner unit, other configuration and operation is essentially the same as that of the image forming apparatus 10.

The image forming apparatus 10 has a scanner unit 13, which is an image input device, a printer unit 14, which is an image output device, a control unit 11 which manages control of operation of the image forming apparatus 10 overall, and a console unit 12, which functions as a user interface (UI).

Next, the configuration of the image forming apparatus 10 is explained.

Figure 2:
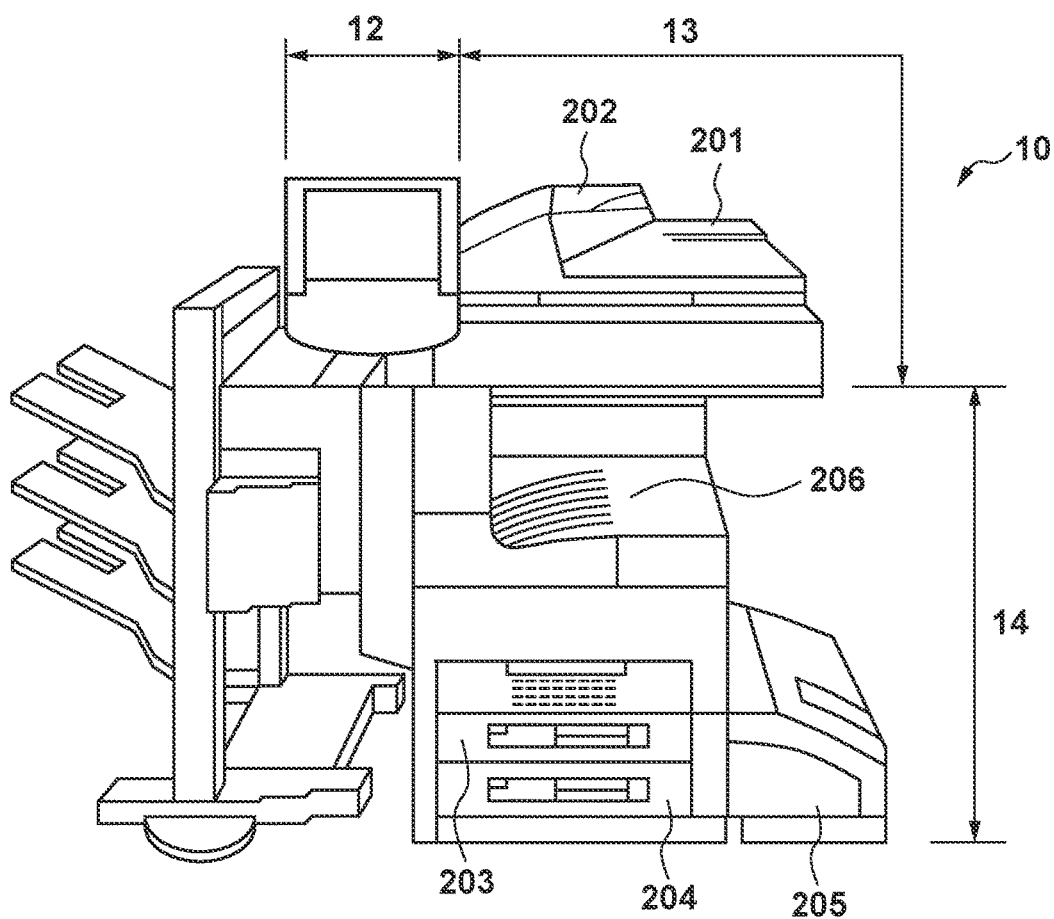
FIG. 2 depicts a view illustrating an example of an outer appearance of the image forming apparatus according to the first embodiment.

FIG. 2 depicts a view illustrating an example of an outer appearance of the image forming apparatus 10 according to the first embodiment.

The scanner unit 13 has a plurality of CCDs. When the sensitivities of the plurality of CCDs are mutually different, even if the densities of pixels on an original are the same, it is recognized that each of the pixels have mutually different densities. Therefore, the scanner unit 13 first performs exposure scanning of a white plate (a plate that is uniformly white), then converts an amount of reflected light obtained by the exposure scanning into an electrical signal, and outputs it to the control unit 11.

Next, explanation is given of a configuration that scans an image that is on an original.

The scanner unit 13 converts information of the original image into an electrical signal by inputting the reflected light obtained by exposure scanning of the image on the original into the CCDs. Furthermore, the scanner unit 13 converts the electrical signal into a luminance signal composed of each of R, G, and B colors, and outputs that luminance signal to the control unit 11 as image data. Note that the original is set in a tray 202 of a document feeder 201. When a user instructs for scanning to start from the console unit 12, an instruction to scan the original is provided from the control unit 11 to the scanner unit 13. Upon receiving this instruction, the scanner unit 13 scans the original after feeding the original one sheet at a time from the tray 202 of the document feeder 201. Note that, a method for scanning an original may be a method that scans the original by a user placing the original on a glass surface (not shown) and causing an exposure unit to move, instead of a scheme of automatically feeding by the document feeder 201.

The printer unit 14 is an image forming device that forms image data received from the control unit 11 on print paper. Note that, although the image formation approach in the first embodiment is an electrophotographic type that uses a photosensitive drum, a photosensitive belt and the like, the present invention is not limited to this. For example, the present invention can also be applied with another method for printing, such as a sublimation type or an ink-jet approach in which an image is printed on print paper by discharging ink from a minute nozzle array. The printer unit 14 is provided with a plurality of sheet cassettes 203, 204, 205 that can respectively store papers of different sizes or different orientations. Printed paper is discharged to a discharge tray 206.

Figure 3:
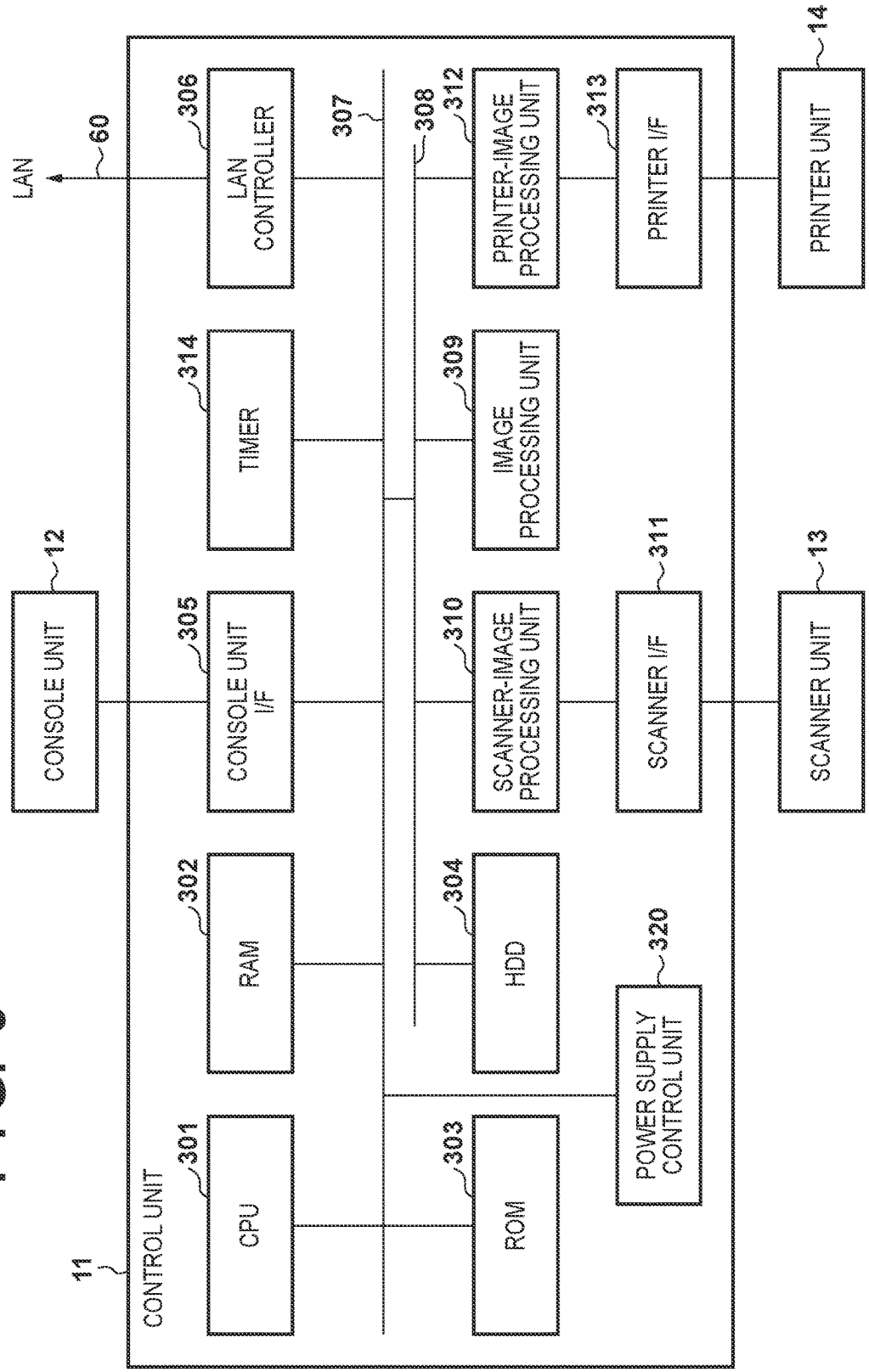
FIG. 3 is a block diagram for explaining a configuration of a control unit of the image forming apparatus according to the first embodiment.

FIG. 3 is a block diagram for explaining a configuration of the control unit 11 of the image forming apparatus 10 according to the first embodiment.

The control unit 11 is electrically connected to the scanner unit 13 and the printer unit 14, but is also connected to the PCs 40, 50, an external apparatus or the like via the LAN 60 or the like. Because of this, it is possible to input/output image data or device information to/from the control unit 11.

A CPU 301, based on a control program or the like stored in a ROM 303, comprehensively controls access to each kind of connected device, and also comprehensively controls various processing performed in the control unit 11. The CPU 301 also performs processing on network packets received via the LAN 60. A RAM 302 is used as a work memory when the CPU 301 operates, and is used as a memory for temporarily storing image data. The RAM 302 is configured by SRAM and DRAM. The ROM 303 stores a boot program and the like of the image forming apparatus 10. An HDD 304 is a hard disk drive, and can store system software and image data. A console unit I/F 305 is an interface unit for connecting a system bus 307 and the console unit 12. The console unit I/F 305 receives image data to be displayed on the console unit 12 via the system bus 307, and outputs it to the console unit 12. In addition, the console unit I/F 305 outputs information input from the console unit 12 to the system bus 307. A LAN controller 306 is connected to the LAN 60 and the system bus 307, and controls communication between the image forming apparatus 10 and the LAN 60 by inputting and outputting information. A timer 314 is an RTC (Real time Clock), and performs timing in accordance with an instruction by the CPU 301, and notifies the CPU 301 of a timed interval.

An image bus 308 is a transmission channel for exchanging image data, and is configured by a PCI bus or IEEE 1394. An image processing unit 309 is something for performing image processing, and can read image data stored in the RAM 302 and perform image processing, such as JPEG or JBIG encoding and decoding, color adjustment or the like. A scanner-image processing unit 310 performs correction, processing, editing, and the like on image data received from the scanner unit 13 via the scanner I/F 311. Note that the scanner-image processing unit 310 performs a determination, based on the received image data, as to whether the scanned original is a color original or monochrome data, whether it is a text original or a photo original, and the like. The scanner-image processing unit 310 then attaches a result of the determination to the image data and outputs it. Such additional information is referred to as attribute data.

A printer-image processing unit 312 refers to attribute data attached to image data, and performs image processing on the image data. The image data after image processing is output to the printer unit 14 via a printer I/F 313.

A power supply control unit 320 performs power supply control at an activation time and a powering off time, and control to change a power supply state to transition to a power saving state and recover from the power saving state. In addition, the power supply control unit 320 is a portion that detects a recovery cause (for example, reception of a FAX, a switch operation, and the like) when recovering from the power saving state, and the power supply control unit 320 performs power supply control when a standby state is transitioned to in accordance with each recovery cause. In addition, the power supply control unit 320 receives a signal or the like for detecting recovery from a power saving state, such as a later-described WAKE signal or an instruction from the CPU 301, and accordingly performs control of whether to supply power to each unit from a first power supply unit 409 (FIG. 4) or a second power supply unit 410 (FIG. 4).

Figure 4:
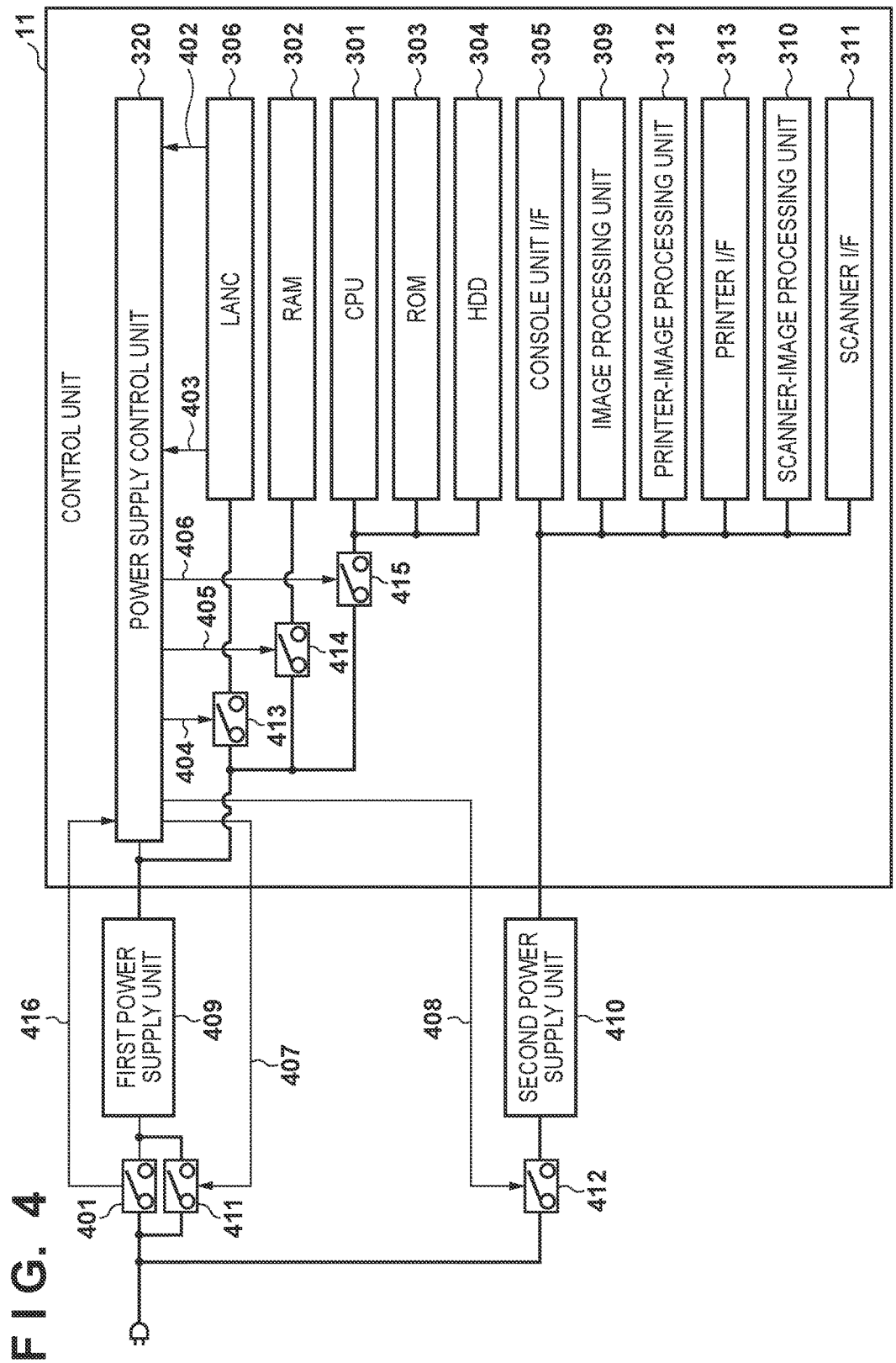
FIG. 4 is a block diagram for explaining a power supply control by a control unit of the image forming apparatus according to the first embodiment.

FIG. 4 is a block diagram for explaining a power supply control by the control unit 11 of the image forming apparatus 10 according to the first embodiment.

The power supply control unit 320 receives an instruction from the CPU 301, or a signal or the like (a Wake1 signal 402, a Wake2 signal 403, or the like) for detecting recovery from the power saving state from the LAN controller 306. In accordance with this instruction or signal, control of whether to supply power to each unit from the first power supply unit 409 or the second power supply unit 410 is performed.

The first power supply unit 409 supplies a power even if the image forming apparatus 10 is in a power saving state, and for example supplies 5V power (a first power). The second power supply unit 410 is something for which supply of power is turned off when the image forming apparatus 10 is in the power saving state, and for example supplies 12V power (a second power). In other words, the second power that the second power supply unit 410 supplies is a power of a higher voltage than that of the first power supplied by the first power supply unit 409.

Figure 5:
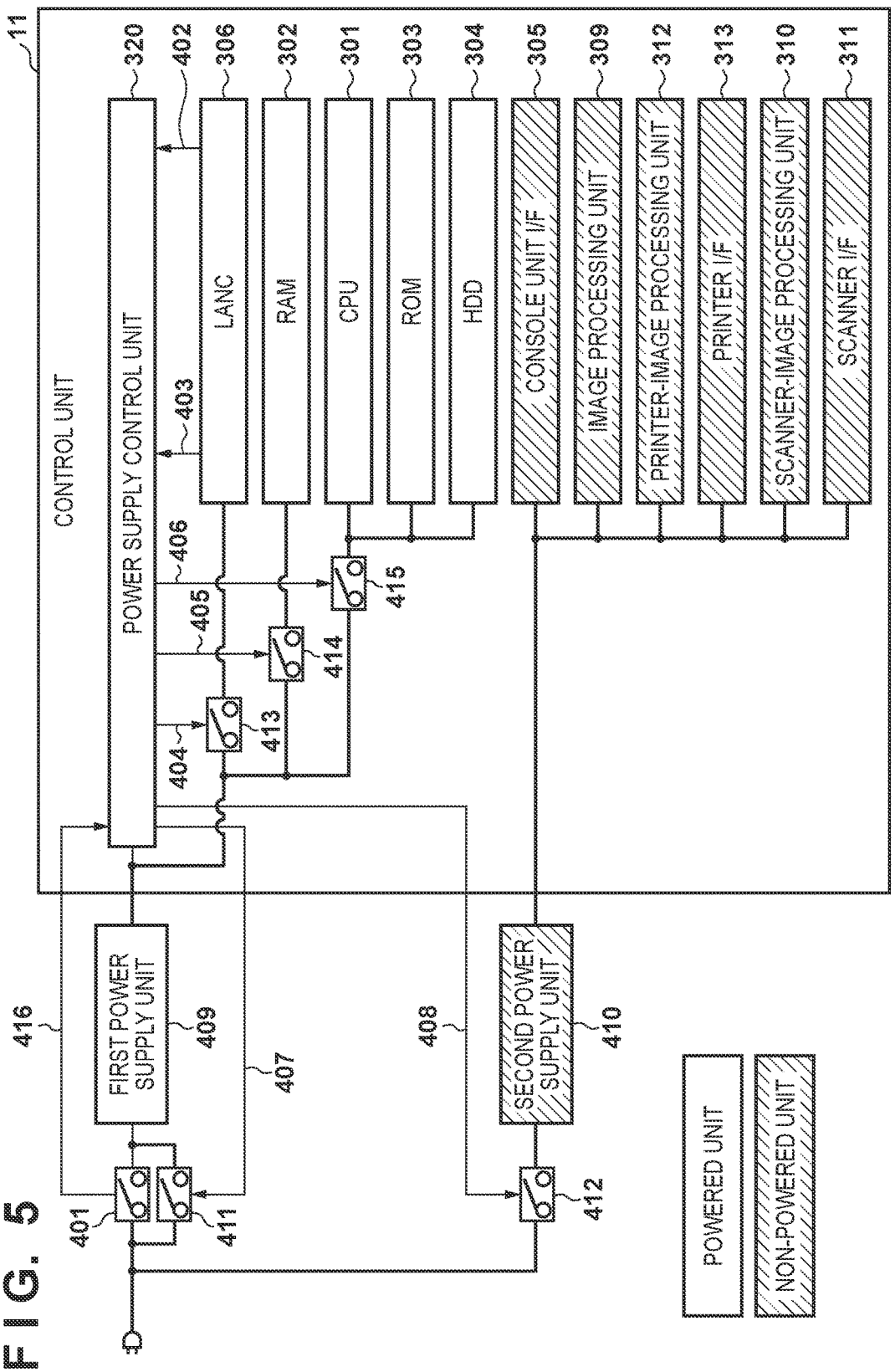
FIG. 5 is a block diagram for explaining an energization state for when the image forming apparatus according to the first embodiment is in a first power saving state.

The power supply control unit 320 performs control of control signals 404-408, and supplies the second power to portions indicated by reference numerals 305 and 309-313 of FIG. 3, in a standby state in which execution of a job is possible. Furthermore, the power supply control unit 320 controls the power supply so as to supply the first power to portions indicated by reference numerals 301-304, the LAN controller 306, and the power supply control unit 320. In addition, the power supply control unit 320 controls the control signals 404-408 to create a power saving state that restricts power consumption. For power saving states, there are a first power saving state, and a second power saving state in which power consumption smaller than that of the first power saving state. In the first power saving state, the supply of electric power to portions indicated by the reference numerals 305 and 309-313 is blocked, and power continues to be supplied to the CPU 301, the RAM 302, the ROM 303, the HDD 304, the LAN controller 306 and the power supply control unit 320. The first power saving state is shown in FIG. 5. Upon transitioning from the standby state to the first power saving state, the power supply control unit 320 controls so as to block power supplied to the portions indicated by the reference numerals 305 and 309-313. In the first power saving state the CPU 301 is powered, and because this is a state in which operation is possible, it is possible to immediately respond to a network packet received via the LAN 60.

FIG. 5 is a block diagram for explaining the energization state when the image forming apparatus 10 according to the first embodiment is in the first power saving state. Note that in FIG. 5 portions common to FIG. 4 are indicated by the same reference numerals. Also, in FIG. 5 a location to which a supply of electric power is stopped is indicated by adding hatching.

In the first power saving state, supply of electric power to the console unit I/F 305, the image processing unit 309, the scanner-image processing unit 310, the scanner I/F 311, the printer-image processing unit 312 and the printer I/F 313 is stopped.

Figure 6:
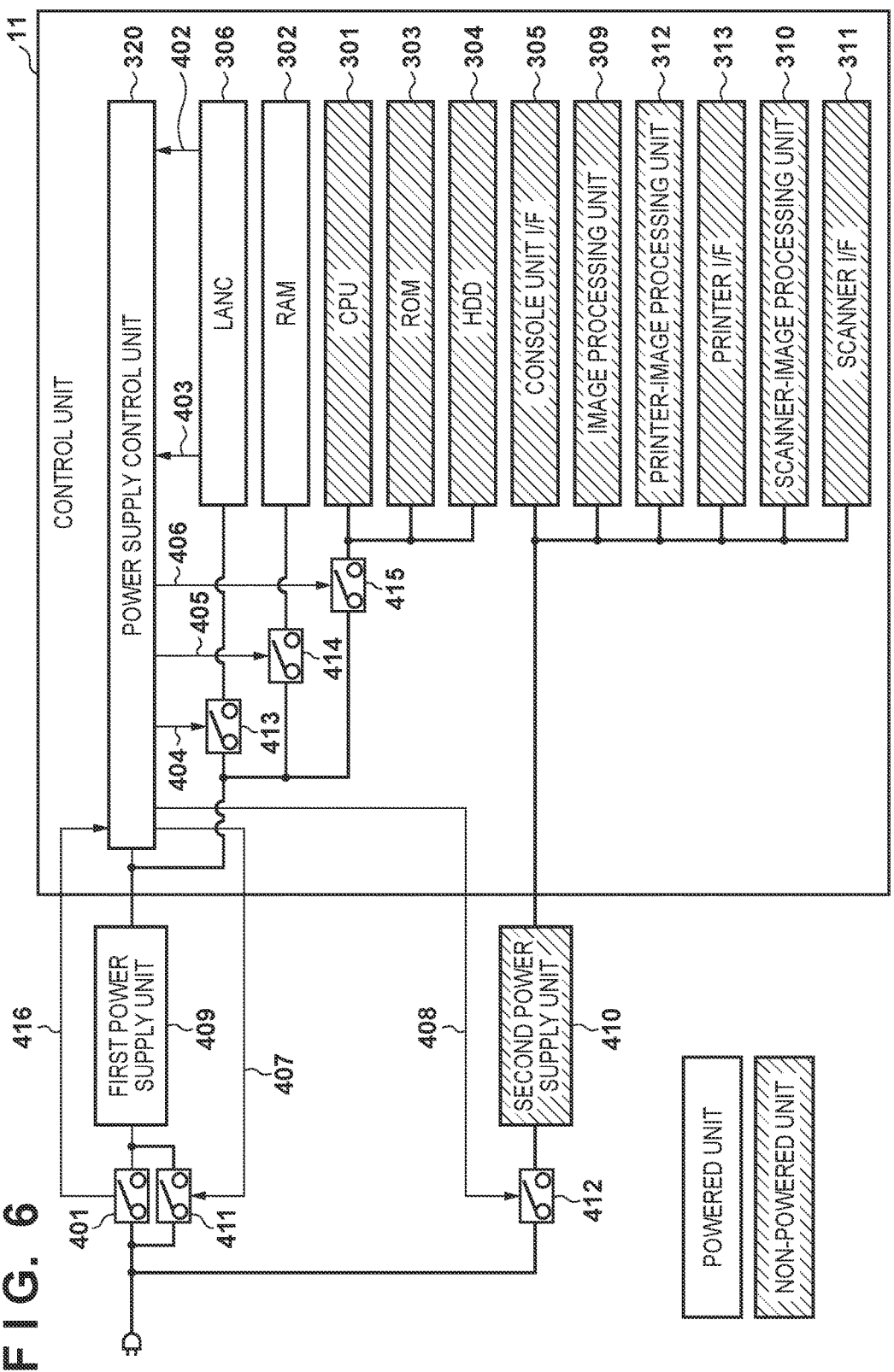
FIG. 6 is a block diagram for explaining an energization state for when the image forming apparatus according to the first embodiment is in a second power saving state.

In the second power saving state, in addition to also blocking supply of electric power to portions indicated by the reference numerals 301, 303-305, and 309-313, control is set to continue to supply power to the RAM 302, the LAN controller 306, and the power supply control unit 320 (an energization state is illustrated in FIG. 6).

FIG. 6 is a block diagram for explaining the energization state when the image forming apparatus 10 according to the first embodiment is in the second power saving state. Note that in FIG. 6 portions common to FIG. 4 are indicated by the same reference numerals. Also, in FIG. 6 a location to which a supply of electric power is stopped is indicated by adding hatching.

In the second power saving state, in addition to portions that are in the non-energization state in FIG. 5, supply of electric power to the CPU 301, the ROM 303, and the HDD 304 is stopped.

Upon transitioning from the standby state to the second power saving state, the power supply control unit 320 controls so as to block power supplied to the portions indicated by the reference numerals 301, 303-305, and 309-313. Even in the second power saving state, it is possible to respond to a portion of packets received (ARP (Address Resolution Protocol) or the like) in accordance with the LAN controller 306. However, the LAN controller 306 cannot respond to all received packets. If a packet that cannot be responded to by the LAN controller 306 is received, there is a need to cause the CPU 301 to recover to a state in which operation is possible, and in the second power saving state a response to a received packet may become late.

The Wake1 signal (a first recovery signal) 402 is a signal for, when, in a case where it is the second power saving state, the LAN controller 306 has received a job packet via the network 60, notifying the power supply control unit 320 from the LAN control) 306 to the effect. The power supply control unit 320, upon detecting the Wake1 signal 402, uses the control signals 404-408 to control OFF/ON of the power supply supplied to each unit.

When in the second power saving state, the LAN controller 306 outputs the Wake2 signal (a second recovery signal) 403, when a packet that is not a job packet and is not a packet for which a proxy response is possible is received from the network 60. Note that this packet is, for example, a query of a state of the image forming apparatus 10 or the like. Upon receiving this packet, and the LAN controller 306 outputs the Wake2 signal 403 to notify the power supply control unit 320 accordingly. The power supply control unit 320, upon detecting the Wake2 signal 403, uses the control signals 404-408 perform a selection on-off the power supply supplied to each unit. The control signals 404-408 are signals for controlling whether or not to supply power to each unit.

In addition, switches 411-415 are switches for which on-off are respectively controlled by the control signals 404-408. By the power supply control unit 320 respectively controlling ON/OFF of the switches 411-415 by the control signals 404-408, it is possible to change a power supply state with respect to each unit. The switches 411-415 can be realized by a FET, a relay switch, or the like.

The control signal 404 and the switch 413 control supply of power to the LAN controller 306. The switch 413 controls so as to supply power to the LAN controller 306 if the image forming apparatus 10 is in a standby state or a power saving state, and to stop power supply to the LAN controller 306 if the image forming apparatus 10 is in an off state. In other words, the switch 413 switches supply and stoppage of power to the LAN controller 306 from the first power supply unit 409.

The control signal 405 and the switch 414 control a first supply of power to the RAM 302. The switch 414 controls so as to supply power to the RAM 302 if the image forming apparatus 10 is in a standby state or a power saving state, and to stop power supply to the RAM 302 if the image forming apparatus 10 is in an off state. In other words, the switch 414 switches supply and stoppage of power to the RAM 302 from the first power supply unit 409.

The control signal 406 and the switch 415 control a first supply of power to the CPU 301, the ROM 303, and the HDD 304. In other words, the switch 415 switches supply and stoppage of power from the first power supply unit 409 to the CPU 301, the ROM 303, and the HDD 304. The control signal 406 controls to supply power to the CPU 301, the ROM 303, and the HDD 304 when the image forming apparatus 10 is in a standby state or the first power saving state. In addition, the control signal 406 controls so as to stop supply of power to the CPU 301, the ROM 303 and the HDD 304 when the image forming apparatus 10 is in the second power saving state or an off state. In other words, the switch 415 switches supply and stoppage of power from the first power supply unit 409 to the CPU 301, the ROM 303, and the HDD 304.

The control signal 407 and the switch 411 control supply of an AC power supply to the first power supply unit 409. The control signal 407 and the switch 411 are turned on by the power supply control unit 320, when a later-described power switch 401 is turned on. Because of this, even when a user has turned the power switch 401 off, it is possible to supply power to the control unit 11. When the power switch 401 is turned off, the power supply control unit 320 detects that the power switch 401 has been turned off in accordance with a signal 416, which is for obtaining an off/on state of the power switch 401. By notifying this to the CPU 301, it is possible to set the supply of power to each unit to off after performing normal shutdown processing. The power switch 401 is a power switch for a user to perform a power on/off operation on the image forming apparatus 10, and an AC power supply is supplied to the first power supply unit 409 when user turns the power switch 401 on.

The control signal 408 and the switch 412 control supply of an AC power supply to the second power supply unit 410. The control signal 408 and the switch 412 control supply of the second power to each unit. For example, explaining by power supply to the image processing unit 309, in the case of the power saving state, the switch 412 is turned off, and a supply of power to the second power supply unit 410 is stopped, and when in standby, the switch 412 is turned on, and power is supplied to the second power supply unit 410. In other words, ON/OFF of the switch 412 is controlled by the power supply control unit 320, and the switch 412 switches stoppage and supply of the second power from the second power supply unit 410.

The first power supply unit 409 converts an AC power supply to a DC power supply, and supplies the first power to the power supply control unit 320 and the like. The first power, which is supplied from the first power supply unit 409, is supplied to the power supply control unit 320 and the like, even when the image forming apparatus 10 has transitioned to a power saving state. In addition, the first power is also supplied to the LAN controller 306 which is for detecting an incoming signal from the network 60 for recovery of the power supply control unit 320 from power saving state.

The second power supply unit 410 converts an AC power supply to a DC power supply, and supplies it as the second power to each device. Supply of the second power, which is supplied from the second power supply unit 410, is stopped when the image forming apparatus 10 is the power saving state. The second power supply unit 410 makes power consumption small when in the power saving state, and is arranged to control power supply to each portion for which power supply is unnecessary when in the power saving state.

Figure 7:
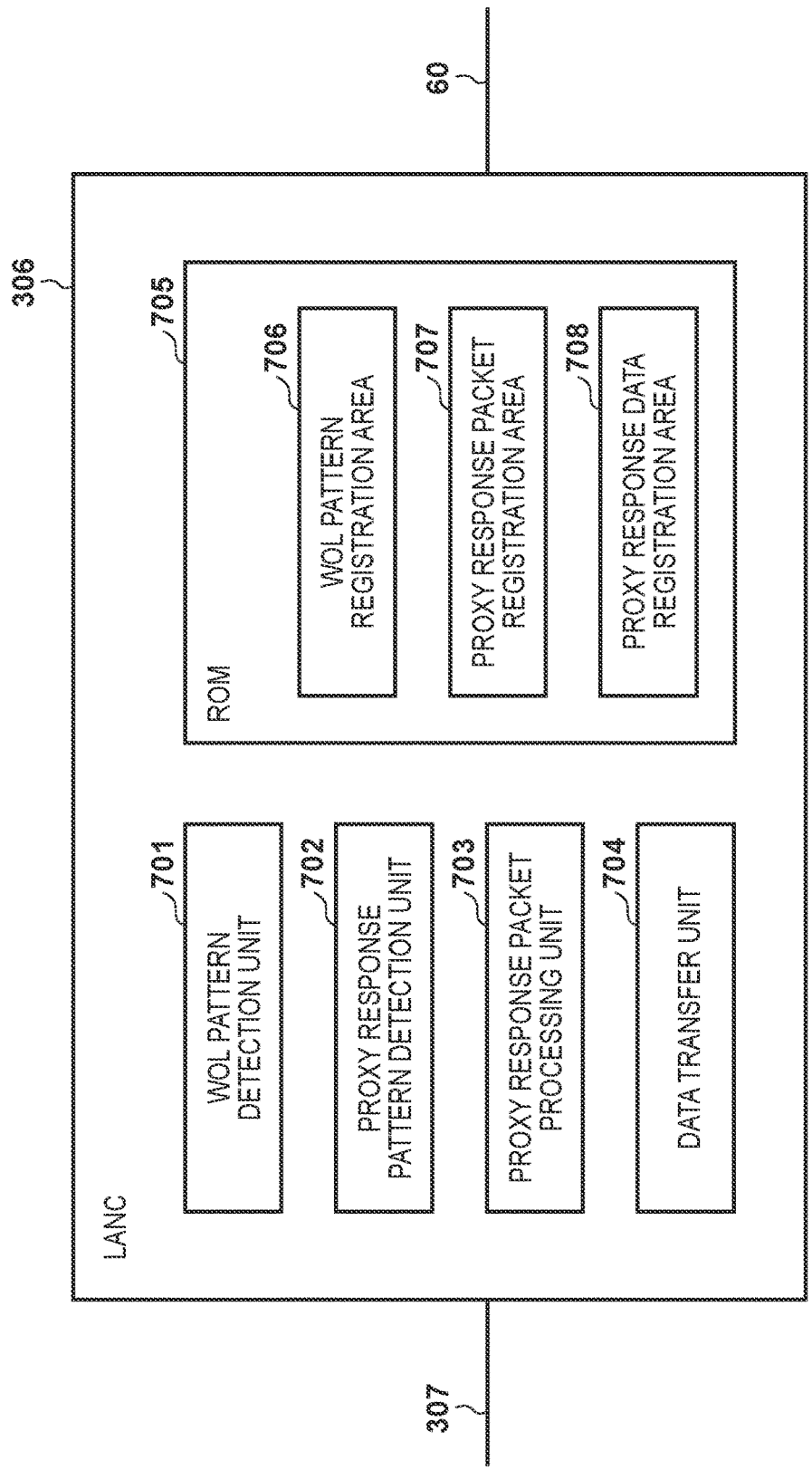
FIG. 7 is a block diagram for explaining in detail a configuration of a LAN controller (LANC) of the image forming apparatus according to the first embodiment.

FIG. 7 is a block diagram for explaining in detail a configuration of the LAN controller (LANC) 306 of the image forming apparatus 10 according to the first embodiment.

As processing functions, the LAN controller 306 has a Wake On LAN (hereinafter, WOL) pattern detection unit 701, a proxy response pattern detection unit 702, a proxy response packet processing unit 703, a data transfer unit 704, and a ROM 705. Furthermore, the ROM 705 has a WOL pattern registration area 706, a proxy response packet registration area 707, and a proxy response data registration area 708. The WOL pattern registration area 706 registers WOL packet patterns. The WOL pattern detection unit 701 determines that it has received a WOL packet when a received packet pattern matches a registered WOL packet pattern. The proxy response packet registration area 707 registers patterns of packets to which the LANC 306 can perform a proxy response. When a received packet pattern matches a registered proxy response packet pattern, the proxy response pattern detection unit 702 determines that it is a packet to which the LANC 306 can perform a proxy response. The proxy response data registration area 708 registers the packet data that the proxy response packet processing unit 703 transmits. The proxy response data registration area 708 registers the packet pattern that the LANC 306 transmits at the time of the proxy response.

While the CPU 301 is in a sleep mode, the WOL pattern detection unit 701 compares a pattern of a packet received from the network 60 with a pattern stored in the WOL pattern registration area 706. If the result of this comparison is that these match, the CPU 301 is caused to activate by performing output a signal to the CPU 301, such as an interrupt. In addition, when a packet that cannot be processed by just the LAN controller 306, such as a print job packet for example, is detected as a WOL pattern in the second power saving state, the image forming apparatus 10 is caused to recover from the power saving state.

While the CPU 301 is in a sleep mode, the proxy response pattern detection unit 702 compares a pattern registered in the proxy response packet registration area 707 with a pattern of a packet received from the network 60. If the result of this comparison is that they match, the proxy response packet processing unit 703 is notified, and a packet is caused to be sent to the network 60 in accordance with a packet pattern registered in the proxy response data registration area 708. In addition, when sending the packet to the network 60, the proxy response packet processing unit 703 can perform generation of a counterparty address, calculation of a packet checksum, or the like, and add such information to the packet. In the second power saving state, when a packet that can be processed by the LAN controller 306, for example an ARP, is detected as a proxy response packet, a response is performed by the LAN controller 306 while maintaining the state of the second power saving state.

The data transfer unit 704 performs, according to an instruction from the CPU 301, processing to transfer data received from the network 60 to the RAM 302, or to transmit data in the RAM 302 to the network 60.

Figure 8:
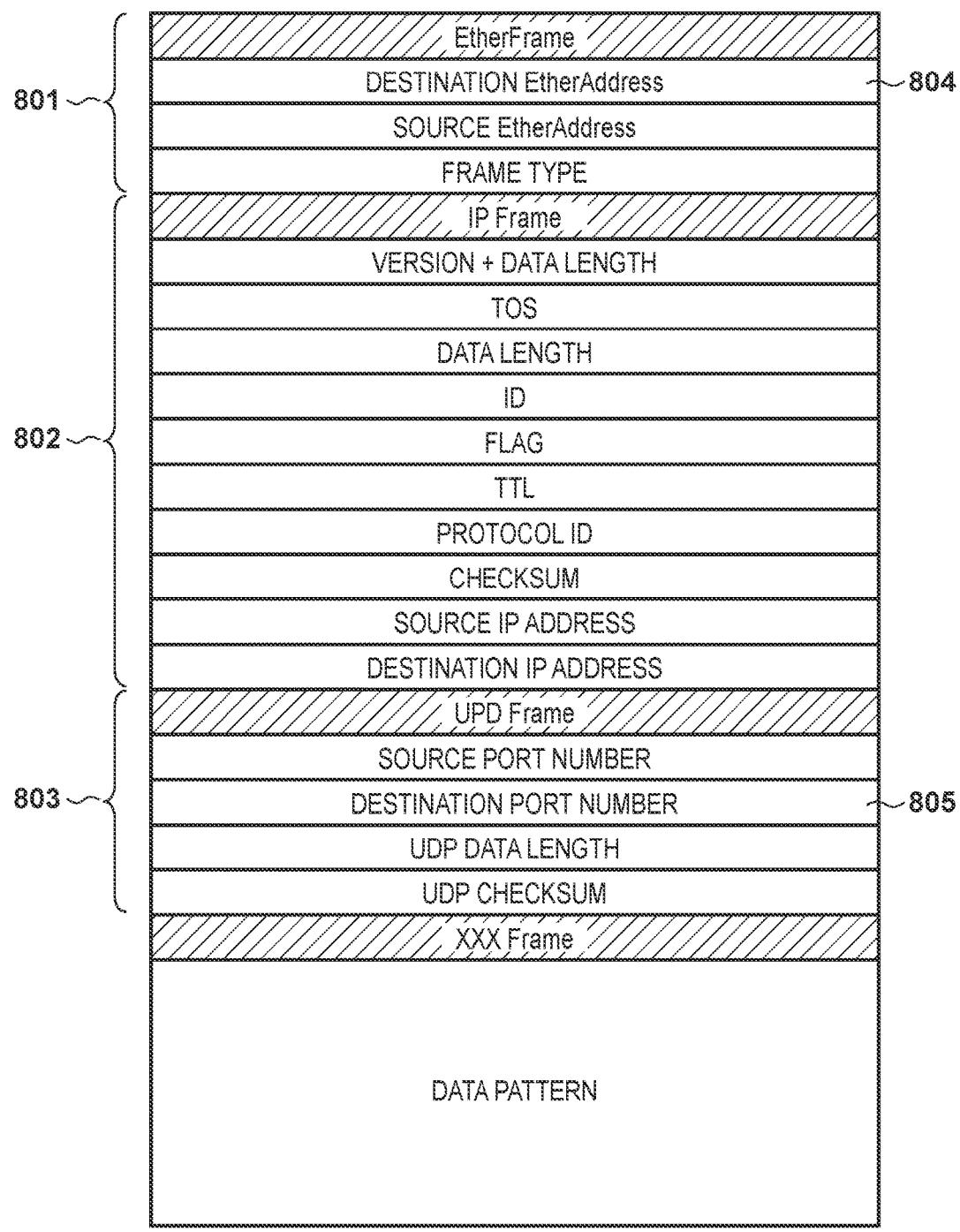
FIG. 8 depicts a view illustrating an example of a packet that the image forming apparatus according to the first embodiment received.

FIG. 8 depicts a view illustrating an example of a packet that the image forming apparatus 10 according to the first embodiment received.

A head portion of the packet has an Ether Frame 801, an IP frame 802, and a UDP frame 803, and thereafter includes a region that changes in accordance with the type of the packet, such as that of an SNMP (Simple Network Management Protocol). Analysis of a packet in a later-described flowchart is performed by comparison of a region illustrated in FIG. 8 of the received packet. For example, if the image forming apparatus 10 is in the second power saving state, the LAN controller 306 compares an EtherAddress 804 of the destination address to a self-apparatus address to determine whether or not the packet is addressed to the self-apparatus. If it is determined to be a packet addressed to the self-apparatus and the image forming apparatus 10 is caused to recover to the standby state, or if the image forming apparatus 10 is caused to recover to the standby state in accordance with a specific data sequence being detected in the region indicated by "XXX Frame", the LANC 306 asserts the Wake1 signal 402. With this the power supply control unit 320 causes switches to be turned on by control signals so as to supply power to each unit, and thereby causes recovery to the standby state.

In addition, even if performing a proxy response, a pattern registered in the proxy response packet registration area 707 and a received packet are compared, and if it is determined to be a packet for which a proxy response should be performed, a proxy response is returned to the network 60. Note that, the configuration of the packet illustrated in FIG. 8 is only one example, and the packet format changes in accordance with IPv4, IPv6, or the like.

FIG. 9 is a flowchart for describing processing when the image forming apparatus 10 according to the first embodiment transitions to a power saving state. Note that processing illustrated by this flowchart is realized by a program that executes this processing being stored in the ROM 303 or the HDD 304, and deployed into the RAM 302 at a time of execution, and the CPU 301 executing the program.

Firstly, in step S901, the CPU 301 determines whether or not a packet has been received via the LAN 60. Here, if the CPU 301 determines that a packet has been received, the processing advances to step S902, and if it determines that a packet has not been received, then it advances the processing to step S906. In step S902 the CPU 301 determines whether or not the packet received in step S901 is a WOL packet. If it is determined to be a WOL packet in step S902, the CPU 301 advances the processing to step S903, and otherwise the CPU 301 advances the processing to step S906. Regarding a determination criterion as to whether or not a packet is a WOL packet, a packet is determined not to be a WOL packet if a response thereto is possible by the LAN controller 306 when in the second power saving state, otherwise, it is determined to be a WOL packet if there is a necessity to respond by the CPU 301. As an example of a packet that the LAN controller 306 can respond in the second power saving state, for example, there is an ARP.

In step S903, the CPU 301 starts timekeeping by the timer 314 to measure a reception time interval of the WOL packet. Upon transitioning to the power saving state, the timer 314 provides determination material for the CPU 301 to determine whether to cause a transition to the first power saving state, or to cause a transition to the second power saving state. In other words, here a configuration is taken so that, when the reception time interval is less than a predetermined amount of time, the first power saving state is transitioned to, and when the reception time interval is greater than or equal to the predetermined amount of time, the second power saving state, which has lower power consumption, is transitioned to.

Next, the processing proceeds to step S904 and the CPU 301 determines whether or not a packet received via the LAN 60 is a WOL packet. Here, if it is determined to be the WOL packet, a transition is made to step S905. If it is determined not to be a WOL packet, the processing proceeds to step S907. In step S905, the CPU 301 stores a timed value of the timer 314, for which the timing operation was initiated in step S903, in the RAM 302 for example, and advances the processing to step S903. Here, the timed value of the timer 314 that is recorded indicates a time interval from reception of the WOL packet until the next reception of the WOL packet.

In step S906, the CPU 301 determines whether or not a transition condition for transitioning to the power saving state has been satisfied. The transition condition is, for example, whether an elapsed time period in which the apparatus has not operated has reached an elapsed time period that is a condition to transition to the power saving state, or if a user has operated a switch that instructs a transition to the power saving state, or the like. In step S906, if the CPU 301 determines that it can transition to the power saving state, the processing proceeds to step S909, the CPU 301 performs processing for transitioning the image forming apparatus 10 to the second power saving state, and processing terminates. However, in step S906, if the CPU 301 determines that the condition to transition to the power saving state has not been satisfied, the processing proceeds to step S901.

In step S907, the CPU 301 determines whether or not a transition condition for transitioning to the power saving state has been satisfied. The condition for transitioning to the power saving state is, for example, whether an elapsed time period in which the apparatus has not operated has reached an elapsed time period that is the condition for transitioning to the power saving state, or if a user has operated a switch that instructs transition to the power saving state, or the like. In step S907, if the CPU 301 has determined that the condition for transition to the power saving state has been satisfied, it advances the processing to step S908, and if the CPU 301 has determined that the condition for transition to the power saving state has not been satisfied, it advances the processing to step S904.

In step S908, the CPU 301 determines whether the timed value by the timer 314 that is held in step S905, in other words the reception time interval between the WOL packets, is greater than or equal to a threshold value. If the CPU 301 determines that the reception time interval of the WOL packet is greater than or equal to the threshold value, the CPU 301 advances the processing to the previously described step S909 and the image forming apparatus 10 transitions to the second power saving state, otherwise the CPU 301 advances the processing to step S910. Configuration may be taken such that the threshold value here can be set by a user, for example, via the console unit 12. In addition, configuration may be such that a default for the threshold value is set to "0", and initially, setting is made so that transition is made to the second power saving state regardless of the environment, and a recommendation of a mode in which a response to a received packet is fast is made to a user.

Furthermore, configuration may be taken such that in step S908 if the CPU 301 has determined to transition to the first power saving state, an alert indicating to a user that the second power saving state being lower power consumption has not been transitioned to is displayed on the console unit 12.

In step S910, the CPU 301 performs processing for transitioning the image forming apparatus 10 to the first power saving state. The processing of step S910 is executed is the reception time interval of the WOL packet in step S908 is small and less than or equal to the threshold value and if a condition for transitioning to the power saving state is satisfied. With this, if the reception time interval of the WOL packet is smaller than a predetermined value, the image forming apparatus 10 can transition to the first power saving state, which has faster responsiveness to a received packet.

With such a configuration, by switching the Power saving state based on the reception time interval of the WOL packet, it is possible to cause transition to a power saving state having lower power consumption (the second power saving state) while preserving convenience for a user. Note that in step S905, the CPU 301 may, each time it receives the WOL packet, store the receiving interval multiple times, and may, in step S908, obtain an average value of the receiving intervals of the plurality of times, and determine to transition to the first power saving state or to transition to the second power saving state by whether or not the average value is greater than or equal to a threshold value.

[Second Embodiment]

In the first embodiment described above, explanation was given of an example of selecting a power-saving state to cause a transition to when transitioning to a power saving state in accordance with a receiving interval of the WOL packet. In contrast to this, in the second embodiment, explanation is given of an example in which the power saving state to transition to is selected when transitioning to a power saving state in accordance with the receiving interval of a packet that is a WOL packet and that also needs to be responded to periodically. Note that because the configuration of the image forming apparatuses 10, 20 according to the second embodiment and the system configuration that includes the image forming apparatuses 10, 20 and the PCs 40, 50 is the same as those in the previously described first embodiment, explanation thereof is omitted.

FIG. 10 is a flowchart for describing processing when the image forming apparatus 10 according to the second embodiment of the present invention transitions to a power saving state. Note that processing illustrated by this flowchart is realized by a program that executes this processing being stored in the ROM 303 or the HDD 304, and deployed into the RAN 302 at a time of execution, and the CPU 301 executing the program.

Firstly, in step S1001 the CPU 301 determines whether or not a packet has been received via the LAN 60. Here, if the CPU 301 determines that a packet has been received, it advances processing to step S1002, and if it determines that a packet has not been received, then it advances to the processing step S1008. In step S1002, the CPU 301 determines whether or not the packet received in step S1001 is a Wake On LAN (hereinafter, WOL) packet. Here, if the CPU 301 determined that the packet is the WOL packet, the CPU 301 advances the processing to step S1003, and otherwise the CPU 301 advances the processing to step S1008. Regarding a determination criterion as to whether or not a packet is the WOL packet, a packet is determined not to be a WOL packet if a response thereto is possible by the LAN controller 306 when in the second power saving state, and otherwise, it is determined to be the WOL packet if there is a necessity to respond by the CPU 301. As an example of a packet that the LAN controller 306 can respond to in the second power saving state, for example, there is an ARP.

In step S1003, the CPU 301 determines whether or not the packet received in step S1001 has a possibility of being a packet that is received periodically. Here, if the CPU 301 determines that the packet is received periodically, the CPU 301 advances processing to step S1004, and otherwise the CPU 301 advances the processing to step S1008. As a packet having a possibility of being received periodically, an SNMP packet is considered, for example.

Here, if a destination port number 805 in previously described FIG. 8 is confirmed to determine whether or not the packet is the SNMP packet, and an Object ID (not shown) in the "XXX Frame" is an ID for which a proxy response cannot be performed, it is determined to be a packet that is received periodically.

In step S1004, the CPU 301 starts timekeeping by the timer 314 to measure a reception time interval of the packet that it is determined to be received periodically. Upon transitioning to a power saving state, the timer 314 times a time interval for the CPU 301 to determine whether to cause a transition to the first power saving state, or to cause a transition to the second power saving state. Next, the processing proceeds to step S1005 and the CPU 301 determines whether or not a received packet is a WOL packet. Here, if the CPU 301 determines that the packet is the WOL packet, it advances processing to step S1006, and otherwise the CPU

301 advances the processing to step S1009. In step S1006, similarly to in step S1003, the CPU 301 determines whether or not the received packet is a packet having a possibility of being received periodically. Here, if the CPU 301 determines that the packet is to be received periodically, the CPU 301 advances processing to step S1007, and if it determines that the packet is not received periodically, the CPU 301 advances the processing to step S1009. As a packet having a possibility of being received periodically, an SNMP packet is considered, for example.

In step S1007, the CPU 301 stores in the RAM 302 a timed value by the timer 314 for which the timing operation was initiated in step S1004. Here, the timed value stored in the RAM 302 indicates a time interval from when a packet having the possibility of being received periodically is received until when a packet having a possibility of being received periodically is next received. In the second embodiment, when transitioning to a power saving state, the CPU 301 determines which of the first power saving state and the second power saving state to transition to based on the time interval timed by the timer 314.

In step S1008, the CPU 301 determines whether or not a transition condition for transitioning to the power saving state has been satisfied. This transition condition for transitioning to the power saving state is whether an elapsed time period in which the image forming apparatus 10 has not operated has reached a time to transition to the power saving state, or if a user has operated a switch for causing transition to the power saving state, or the like. Here, if the CPU 301 has determined that the condition for transitioning to the power saving state has been satisfied, the processing advances to step S1011, and if it has determined that the condition for transition to the power saving state has not been satisfied, the processing advances to step S1001. In step S1011, the CPU 301 performs processing for transitioning the image forming apparatus 10 to the second power saving state. This is executed if the reception time interval of the periodically received packet is greater than or equal to a threshold value, or if a condition for transition to the power saving state is satisfied in a state in which a WOL packet is not received, or in which a packet having a possibility of being received periodically is not received even if a WOL packet is received.

In step S1009, the CPU 301 determines whether or not a condition for transition to the power saving state has been satisfied. This transition condition for transitioning to the power saving state is whether an elapsed time period in which the image forming apparatus 10 has not operated has reached a time to transition to the power saving state, or if a user has operated a switch for causing transition to the power saving state, or the like. Here, if the CPU 301 has determined that the transition condition for transitioning to the power saving state has been satisfied, the processing advances to step S1010, and otherwise the processing advances to step S1005. In step S1010, the CPU 301 determines whether the timed value that is stored to the RAM 302 in step S1007, in other words the reception time interval of the packet having the possibility of being received periodically, is greater than or equal to a threshold value. If it is determined that the reception time interval of the packet is greater than or equal to the threshold value, processing advances to the step S1011 and the image forming apparatus 10 transitions to the second power saving state. However, in step S1010, if it is determined that the reception time interval of a packet having the possibility of being received periodically is lower than the threshold value, processing is advanced to the step S1012 and the image forming apparatus 10 transitions to the first power saving state. Note that in step S1007, the CPU 301 may, each time it receives a packet that is received periodically, store the receiving interval multiple times, and may, in step S1010, obtain an average value of the receiving intervals of the plurality of times, and determine to transition to the first power saving state or to transition to the second power saving state by whether or not the average value is greater than or equal to a threshold value.

With this, the image forming apparatus 10 can transition to the second power saving state, which has lower power consumption, if the reception time interval of a packet having the possibility of being received periodically is longer than a predetermined value, or if a WOL packet is not received, or a packet having the possibility of being received periodically is not received even if a WOL packet is received. Note that, configuration may be taken such that the threshold value can be set arbitrarily by a user.

In addition, configuration may be such that a default for threshold value is set to "0", and initially, setting is made so that transition is made to the second power saving state regardless of the environment, and a recommendation of a mode in which a response to a received packet is able to be fast is made to a user.

Furthermore, configuration may be taken to display an alert indicating to a user that the second power saving state having lower power consumption has not been transitioned to, if it has been determined to transition to the first power saving state.

The processing for transition of the image forming apparatus 10 to the first power saving state is executed when a transition to the power saving state has occurred in a case where the reception time interval of a packet having the possibility of being received periodically is less than or equal to the threshold value. Because of this, when the reception time interval of a packet having the possibility of being received periodically is short, the image forming apparatus 10 can transition to the first power saving state, which has faster responsiveness to a received packet.

In this way, a power saving state is switched when transitioning to the power saving state based on a reception time interval of a packet having the possibility of being received periodically and a WOL packet. Herewith, it is possible to cause transition to a power saving state having lower power consumption while preserving convenience for a user.

[Third Embodiment]

Next, explanation will be given for a third embodiment of the present invention. In the third embodiment, a user can set in advance whether to transition to either of the previously described first power saving state or second power saving state when the image forming apparatus 10 transitions to a power saving state. Then, the image forming apparatus 10 transitions to the first power saving state or the second power saving state in accordance with the setting of the user when it is determined that the condition to transition to the power saving state as described above is satisfied. Also, the image forming apparatus 10, as in the foregoing first and second embodiments, measures the packet reception time interval, and if the time interval is longer than a predetermined amount of time and if the foregoing setting by the user is for the first power saving state, recommends transition to the second power saving state. Note that because the configuration of the image forming apparatuses 10, 20 according to the third embodiment and the system configuration that includes the image forming apparatuses 10, 20 and the PCs 40, 50 is the same as those in the previously described first embodiment, explanation thereof is omitted.

Figure 11A:
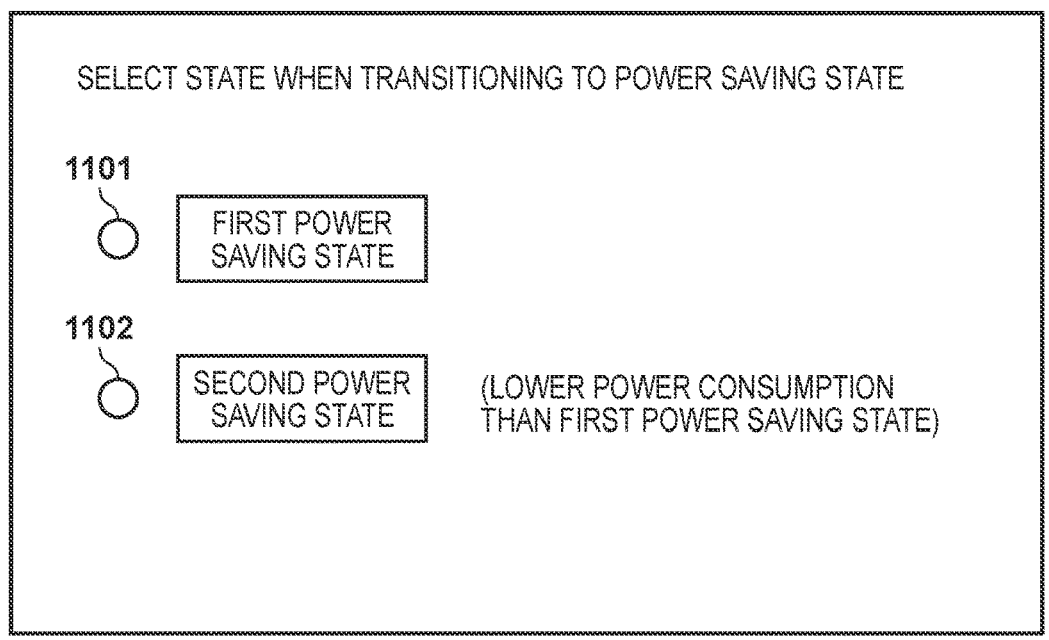
FIGS. 11A and 11B depict views UI screen examples according to a third embodiment of the present invention.

FIG. 11A depicts a view for showing an example of a screen displayed on a display unit of the console unit 12 to allow a user to set in advance whether to transition to the foregoing first power saving state or second power saving state when the image forming apparatus 10 transitions to the power saving state.

Here, it is possible to set to transition to the first power saving state or the second power saving state by radio buttons 1101 or 1102. The content set in this screen is stored in the RAM 302.

Figure 12A:
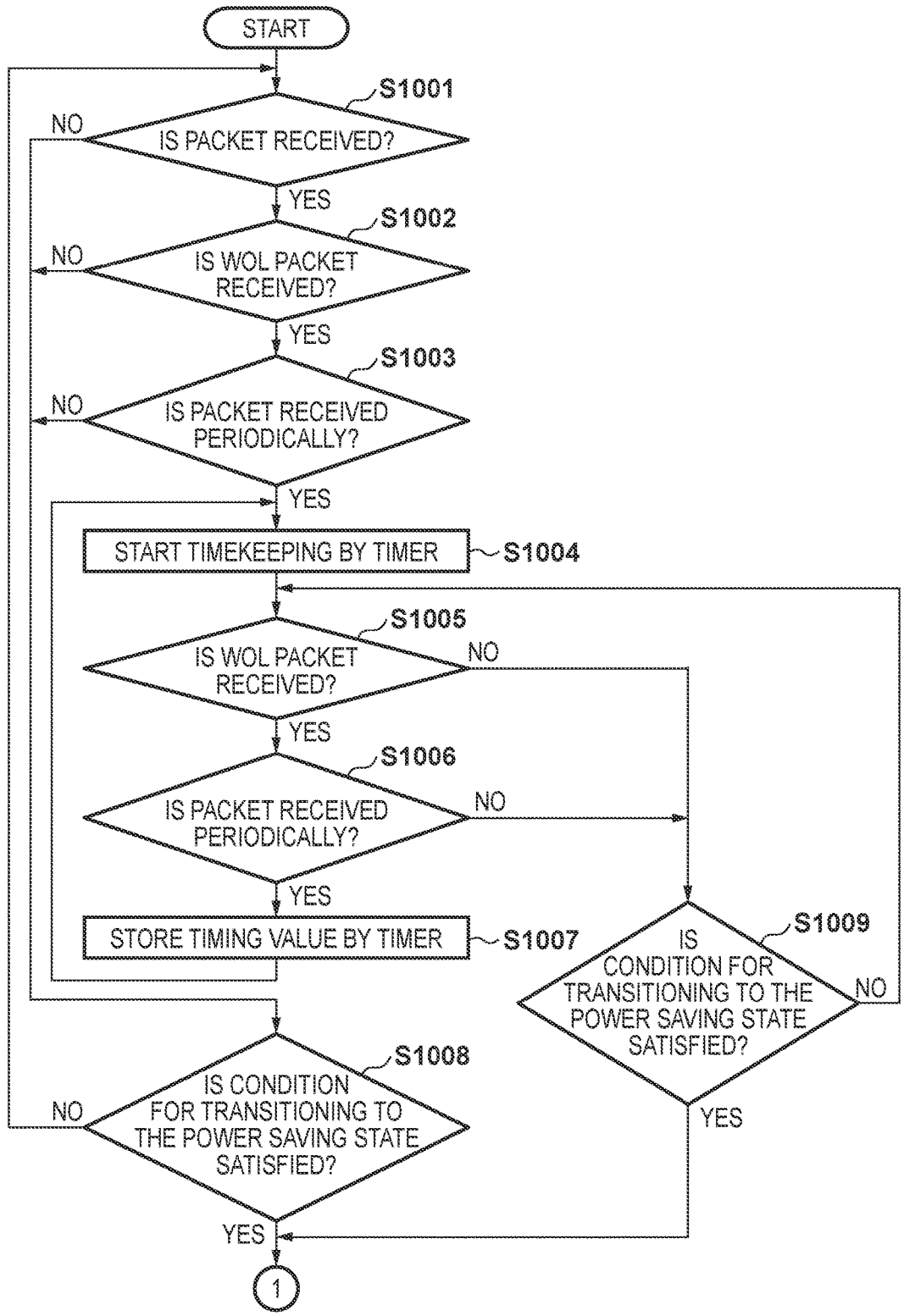
FIGS. 12A and 12B are flowcharts for describing processing when the image forming apparatus according to the third embodiment transitions to a power saving state.
Figure 12B:
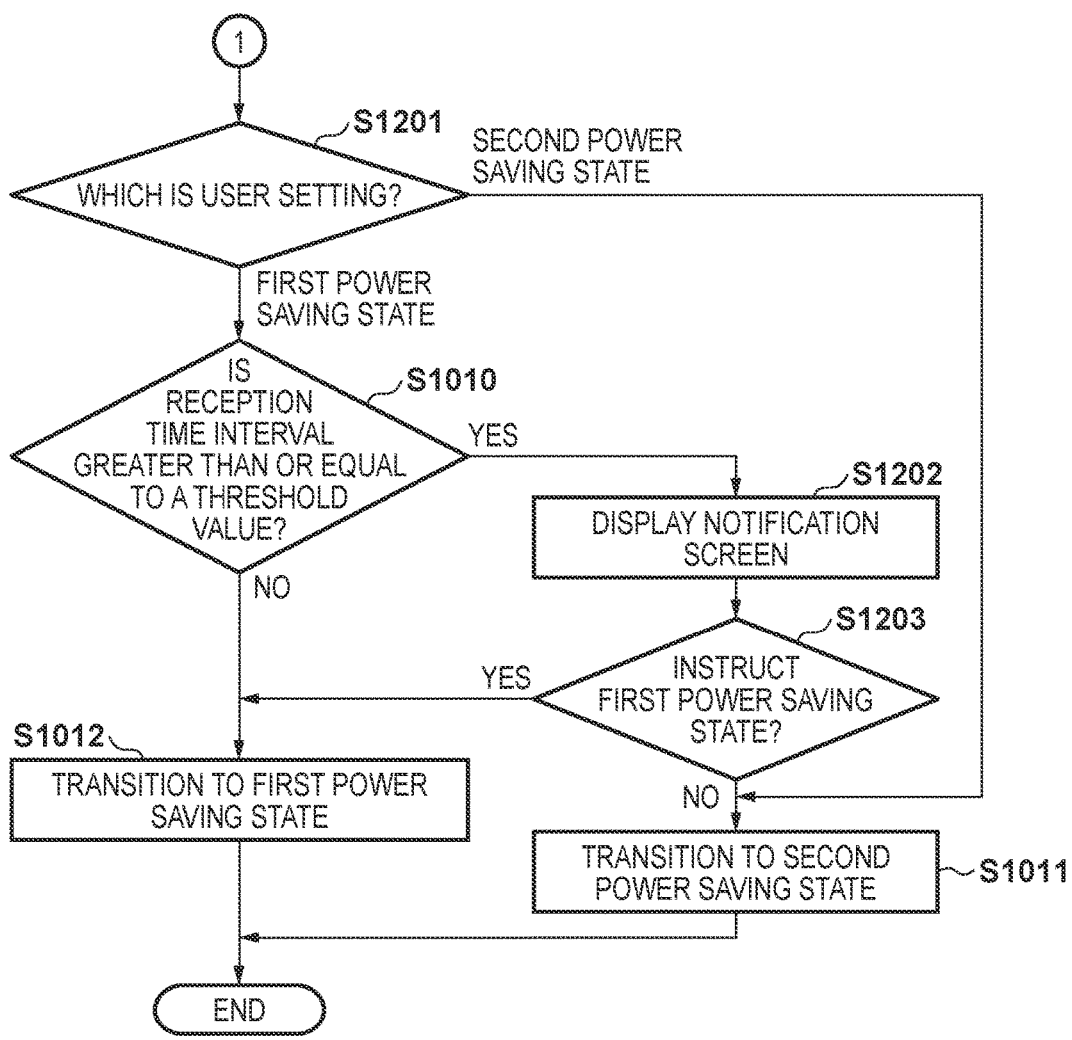

FIGS. 12A and 12S are flowcharts for describing processing when the image forming apparatus 10 according to the third embodiment of the present invention transitions to a power saving state. Note that processing illustrated by this flowchart is realized by a program that executes this processing being stored in the ROM 303 or the HDD 304, and deployed into the RAM 302 at a time of execution, and the CPU 301 executing the program. In FIGS. 12A and 12B, processing common to FIG. 10 is illustrated with the same reference numerals and explanation thereof is omitted.

When the condition to transition to the power saving state is determined to be satisfied in step S1008 or step S1009, the processing proceeds to step S1201. In step S1201, the CPU 301 reads the power saving state set via the screen in FIG. 11A from the RAM 302, and determines whether setting is for the first power saving state or for the second power saving state. If the CPU 301 determines here the setting is for the second power saving state, the processing proceeds to step S1011, and the CPU 301 causes the image forming apparatus 10 to transition into the second power saving state.

On the other hand, in step S1201, if the CPU 301 determines that the first power saving state is set, the processing proceeds to step S1010, and the CPU 301 determines whether or not the reception time interval for a packet having the possibility of being received periodically is longer than the threshold value. In step S1010, if it is determined that the reception time interval of a packet having the possibility of being received periodically is shorter than the threshold value, processing is advanced to the step S1012 and the CPU 301 causes the image forming apparatus 10 to transition to the first power saving state. Meanwhile, if the CPU 301 determines that the packet reception time interval is longer than the threshold value in step S1010, the processing proceeds to step S1202. In step S1202, the CPU 301 displays a screen as illustrated in FIG. 11B, for example, on the display unit of the console unit 12.

Figure 11B:
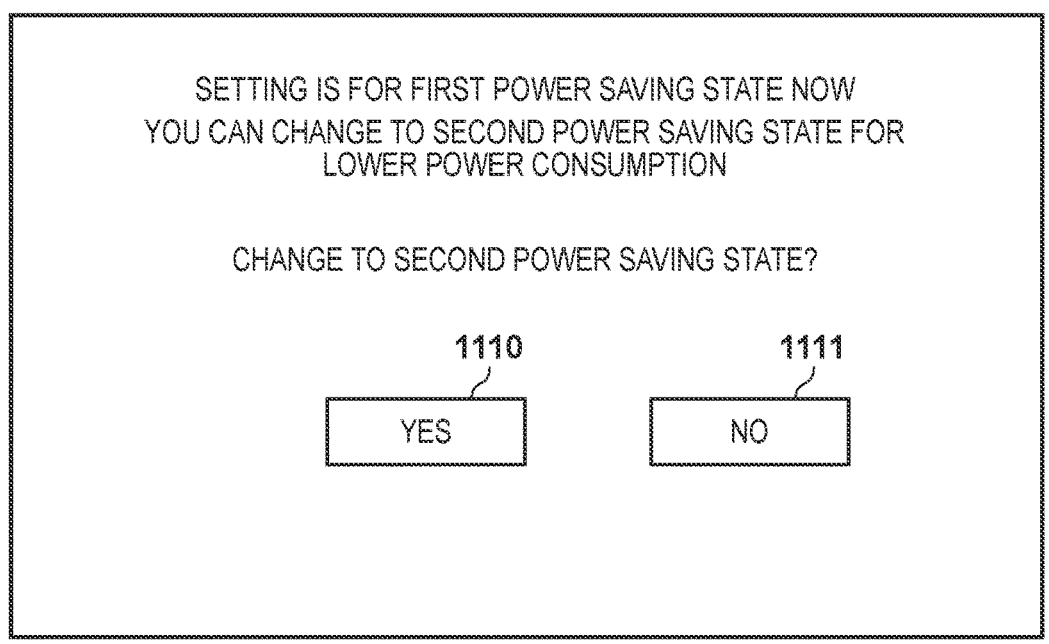

FIG. 11B depicts a view illustrating an example of a screen by which a user is asked whether or not to change to transition to the second power saving state having lower power consumption when the first power saving state is set.

The CPU 301, in step S1203, identifies which of buttons 1110, 1111 is pressed on the screen of FIG. 11B. Here, if the user presses the "YES" button 1110, the processing proceeds to step S1011 from step S1203, and the image forming apparatus 10 is caused to transition into the second power saving state. Meanwhile, if the user presses the "NO" button 1111, the processing proceeds to step S1012 from step S1203, and the image forming apparatus 10 is caused to transition into the first power saving state.

By virtue of the third embodiment, the image forming apparatus 10 can recommend a user to set the power saving state having lower power consumption than that of the power saving state that the user has set, when the packet reception time interval is measured and the reception time interval is longer than a predetermined value.

Also, though not explained in the drawings in the third embodiment, a user may be recommended to set the first power saving state so not to allow responsiveness with respect to a packet to deteriorate, when conversely the user setting is for the second power saving state and the packet reception time interval is shorter than a predetermined value, for example.

Also, a mode that prioritize either the user setting or the determination of the image forming apparatus for determination of the power saving state to be transitioned into may be arranged. Then, configuration may be taken such that if the user setting is prioritized, the user setting is followed irrespective of the packet reception time interval.

Note that the configuration of various data in the foregoing embodiment, and the content thereof, are not limited to this, and it goes without saying that various configuration and content can be configured in accordance with intended use and object.

While embodiments are illustrated above, the present invention can take embodiments as, for example, a system, an apparatus, a method, a program, or a storage medium, or the like. More specifically, application to a system comprised from a plurality of devices may be performed, and application to an apparatus comprising a single device may be performed. Also, configurations that combine the foregoing embodiments are all encompassed in the present invention.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082857, filed Apr. 14, 2015, which is hereby incorporated by reference herein in its entirety.

What is claimed is:

1. An information processing apparatus capable of having a plurality of power saving states, the apparatus comprising:
a setting unit configured to set, in accordance with a user instruction, a power saving state to apply to the information processing apparatus among the plurality of power saving states;
a power supply control unit configured to cause the information processing apparatus, if the information processing apparatus has satisfied a transition condition, to transition to the power saving state set by the setting unit among the plurality of power saving states;
a timer unit configured to time a time interval from a first timing at which a specific packet is received via a network to a second timing at which the specific packet is received via the network;
a determination unit configured to determine, based on the time interval timed by the timer unit, whether or not a power saving state to apply to the information processing apparatus requires prompting a user to change to another power saving state from the power saving state set by the setting unit; and
a notification unit configured to prompt a user to change the power saving state to apply to the information processing apparatus, if it is determined by the determination unit that it is necessary to prompt the user to change the power saving state to apply to the information processing apparatus.

2. The information processing apparatus according to claim 1, further comprising
a CPU, and
a LAN controller,
wherein the plurality of power saving states includes at least a first power saving state in which power is supplied to both of the CPU and the LAN controller and a second power saving state in which power is not supplied to the CPU but power is supplied to the LAN controller.

3. The information processing apparatus according to claim 2, wherein
upon a condition in which the first power saving state is set by the setting unit and the time interval timed by the timer unit is greater than or equal to a predetermined threshold value, the determination unit determines that it is necessary to prompt the user to change the power saving state to apply to the information processing apparatus.

4. The information processing apparatus according to claim 3, wherein the notification unit prompts the user to change the power saving state to apply to the information processing apparatus from the first power saving state to the second power saving state.

5. The information processing apparatus according to claim 1, wherein the notification unit displays a notification screen that prompts the user to change the power saving state to apply to the information processing apparatus.

6. The information processing apparatus according to claim 1, wherein the specific packet is a packet classified as a WOL packet, which is a cause for the information processing apparatus to recover from the power saving state.

7. The information processing apparatus according to claim 1, wherein the specific packet is a packet classified as a WOL packet, which is a cause for the information processing apparatus to recover from the power saving state and is a packet periodically transmitted from an external device to the information processing apparatus via the network.

8. The information processing apparatus according to claim 1, wherein the information processing apparatus is a printing apparatus configured to execute processing for printing.

9. A method of controlling an information processing apparatus capable of having a plurality of power saving states, the method comprising:
setting, in accordance with a user instruction, a power saving state to apply to the information processing apparatus among the plurality of power saving states;
causing the information processing apparatus, if the information processing apparatus has satisfied a transition condition, to transition to the power saving state set in the setting among the plurality of power saving states;
timing a time interval from a first timing at which a specific packet is received via a network to a second timing at which the specific packet is received via the network;
determining, based on the time interval timed in the timing, whether or not a power saving state to apply to the information processing apparatus requires prompting a user to change to another power saving state from the power saving state set in the setting; and
prompting a user to change the power saving state to apply to the information processing apparatus, if it is determined in the determining that it is necessary to prompt the user to change the power saving state to apply to the information processing apparatus.

10. A non-transitory computer readable storage medium storing a program for causing a processor to execute a method of controlling an information processing apparatus capable of having a plurality of power saving states, the method comprising:
setting, in accordance with a user instruction, a power saving state to apply to the information processing apparatus among the plurality of power saving states;
causing the information processing apparatus, if the information processing apparatus has satisfied a transition condition, to transition to the power saving state set in the setting among the plurality of power saving states;
timing a time interval from a first timing at which a specific packet is received via a network to a second timing at which the specific packet is received via the network;
determining, based on the time interval timed in the timing, whether or not a power saving state to apply to the information processing apparatus requires prompting a user to change to another power saving state from the power saving state set in the setting; and
prompting a user to change the power saving state to apply to the information processing apparatus, if it is determined in the determining that it is necessary to prompt the user to change the power saving state to apply to the information processing apparatus.

* * * * *